(12) United States Patent
Li et al.

(10) Patent No.: US 7,756,853 B2
(45) Date of Patent: Jul. 13, 2010

(54) FREQUENT ITEMSET COUNTING USING SUBSETS OF BITMAPS

(75) Inventors: Wei Li, San Carlos, CA (US); Ari W. Mozes, Lexington, MA (US); Hakan Jakobsson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 325 days.

(21) Appl. No.: 10/927,893

(22) Filed: Aug. 27, 2004

(65) Prior Publication Data

US 2005/0050077 A1   Mar. 3, 2005

(51) Int. Cl.
 *G06F 7/00* (2006.01)
(52) U.S. Cl. .............................. 707/713; 707/720
(58) Field of Classification Search ............ 707/2, 707/3, 102
 See application file for complete search history.

(56) References Cited

U.S. PATENT DOCUMENTS

| | | | |
|---|---|---|---|
| 5,259,066 A | | 11/1993 | Schmidt et al. |
| 5,724,573 A * | | 3/1998 | Agrawal et al. ............... 707/6 |
| 5,794,209 A | | 8/1998 | Agrawal et al. |
| 6,049,797 A | | 4/2000 | Guha et al. |
| 6,192,374 B1 * | | 2/2001 | Lawrence ............... 707/104.1 |
| 6,226,634 B1 * | | 5/2001 | Ogihara et al. ............... 707/4 |
| 6,324,533 B1 | | 11/2001 | Agrawal et al. |
| 6,453,404 B1 | | 9/2002 | Bereznyi et al. |
| 6,513,029 B1 | | 1/2003 | Agrawal et al. |
| 6,832,216 B2 | | 12/2004 | Shintani et al. |
| 6,993,534 B2 | | 1/2006 | Denesuk et al. |
| 6,996,551 B2 | | 2/2006 | Hellerstein et al. |
| 2002/0059191 A1 | | 5/2002 | Tamura |
| 2002/0087561 A1 | | 7/2002 | Chen et al. |
| 2003/0009456 A1 * | | 1/2003 | Shintani et al. ............... 707/6 |
| 2003/0149554 A1 * | | 8/2003 | Lambert et al. ............... 703/2 |
| 2003/0236785 A1 * | | 12/2003 | Shintani et al. ............... 707/6 |
| 2004/0225742 A1 | | 11/2004 | Loaiza et al. |

(Continued)

OTHER PUBLICATIONS

Argawal et al. "Mining Association Rules between Sets of Items in Large Databases". Jun. 1993. ACM. Issue 2, vol. 22. pp. 207-216. Retrieved Jan. 24, 2007 from <http://portal.acm.org/ft_gateway.cfm?id=170072&type=pdf&coll=portal&dl=ACM&CFID=9810126&CFTOKEN=26940288>.*

(Continued)

*Primary Examiner*—Cheyne D Ly
(74) *Attorney, Agent, or Firm*—Hickman Palermo Truong & Becker LLP; Eric L. Sutton

(57) ABSTRACT

A method and mechanism for performing improved frequent itemset operations is provided. A set of item groups are divided into a plurality of subsets. Each item group is composed of a set of data items. Possible combinations of data items that may frequently appear together in the same item group are referred to as candidate combinations. Candidate combinations comprising a first set of data items are identified, and thereafter the occurrence of each candidate combination in any item group in each subset is counted by comparing item bitmaps, associated with items in the candidate combination, in each subset in turn. The comparison of item bitmaps is performed in volatile memory. A total frequent itemset count that describes the frequency of candidate combinations in items groups across all subsets is obtained. Thereafter, the total frequent itemset count for candidate combinations having a larger number of data items may be determined.

12 Claims, 6 Drawing Sheets

| DATA ITEMS | ITEMBITMAP ITEM GROUP 1 | ITEM GROUP BITMAP ITEM GROUP 2 | ITEM GROUP 3 | |
|---|---|---|---|---|
| APPLE | 1 | 0 | 1 | |
| PEACH | 0 | 0 | 1 | |
| WATERMELON | 1 | 0 | 0 | |
| CHEERY | 1 | 1 | 0 | |
| GRAPEFRUIT | 0 | 1 | 1 | |
| PINEAPPLE | 1 | 1 | 1 | |
| BLUEBERRY | 1 | 0 | 0 | |
| STRAWBERRY | 0 | 1 | 1 | ... |
| • • • | SUBSET 1 | | SUBSET 2 | |

U.S. PATENT DOCUMENTS

2005/0149540 A1  7/2005  Chan et al.

OTHER PUBLICATIONS

Burdick et al. "MAFIA: A Maximal Frequent Itemset Algorithm for Transactional Database". 2001. 17th International Conference on Data Engineering (ICDE'01). pp. 1-6. Retrieved Jan. 24, 2007 from <http://www.almaden.ibm.com/cs/projects/iis/hdb/Publications/papers/sigmod93.pdf>.*

Grahne et al. "High Performance Mining of Maximal Frequent Itemsets". May 17, 2005. pp. 1-4. Retrieved on Jan. 24, 2007 from<http://www.cs.concordia.ca/db/dbdm/hpdm03.pdf>.*

Ayres et al., The Eighth ACM SIGKDD International Conference on Knowledge Discovery and Data Mining, Jul. 23-26, 2002, Edmonton, Canada, pp. 429-435.*

Ganti et al., Computer, vol. 8, IEEE, 1999, pp. 38-45.*

Oracle Corporation, Frequent Itemsets in Oracle10g, Aug. 2002, pp. 1-10.*

Hu et al., Proceedings of the Seventh International Database Engineering and Applications Symposium, Jul. 16-18, 2003, pp. 1-10.*

Agrawal et al., Proceedings of the 1993 ACM SIGMOD Conference, Washington DC, USA May 1993, pp. 1-10.*

Rantzau, R., DMKD'03, Jun. 13, 2003, San Diego, CA USA, pp. 20-27.*

Agrawal et al., In Proceedings of the Twentieth International Conference on Very Large Databases, Santiagon, Chile, 1994, pp. 487-499.*

Jensen et al., PAKDD 2000, T. Terano, H. Liu, and A. L. P. Chen (Eds), LNAI 1805, Springer-Verlag Berlin Heidelberg 2000, pp. 49-61.*

Gardarin et al., Data & Knowledge Engineering vol. 46, Issue 1, Jul. 2003, pp. 97-121.*

Zaki et al., SIGKDD '03, Aug. 24-27, 2003, Washington, DC, pp. 326-335.*

Wei Li, et al.,"Computing Frequent Itemsets Inside Oracle 10G", Proceedings of the $30^{th}$ VLDB Conference, Toronto, Canada, Aug. 29, 2004, 4 pages.

Office Action from European Patent Application No. 01968979.3-2212, dated Aug. 6, 2004 (3 pgs.).

Current Claims in European Patent Application No. 01968979.3-2212 (3 pgs).

Written Opinion from PCT Patent Application No. PCT/US02/06981 dated Oct. 3, 2004(8 pgs.).

Current Claims in PCT Patent Application No. PCT/US02/06981 (8 pgs.).

Office Action from Canadian Patent Application No. 2,448,050 dated Oct. 1, 2004 (2 pgs).

Current Claims in Canadian Patent Application No. 2, 448,050 (48 pgs).

* cited by examiner

TABLE 200 (MULTIPLE-ITEMS-PER-ROW FORMAT)

| iid1 | iid2 | iid3 | iid4 | iid5 |
|---|---|---|---|---|
| apple | banana | NULL | NULL | NULL |
| apple | milk | banana | NULL | NULL |
| orange | NULL | NULL | NULL | NULL |

ROW 202
ROW 204
ROW 206

*Fig. 2*

| DATA ITEMS | ITEM GROUP 1 | ITEM GROUP 2 | ITEM GROUP 3 |
|---|---|---|---|
| APPLE | 1 | 0 | 1 |
| PEACH | 0 | 0 | 1 |
| WATERMELON | 1 | 0 | 0 |
| CHEERY | 1 | 1 | 0 |
| GRAPEFRUIT | 0 | 1 | 1 |
| PINEAPPLE | 1 | 1 | 1 |
| BLUEBERRY | 1 | 0 | 0 |
| STRAWBERRY | 0 | 1 | 1 |

Fig. 5

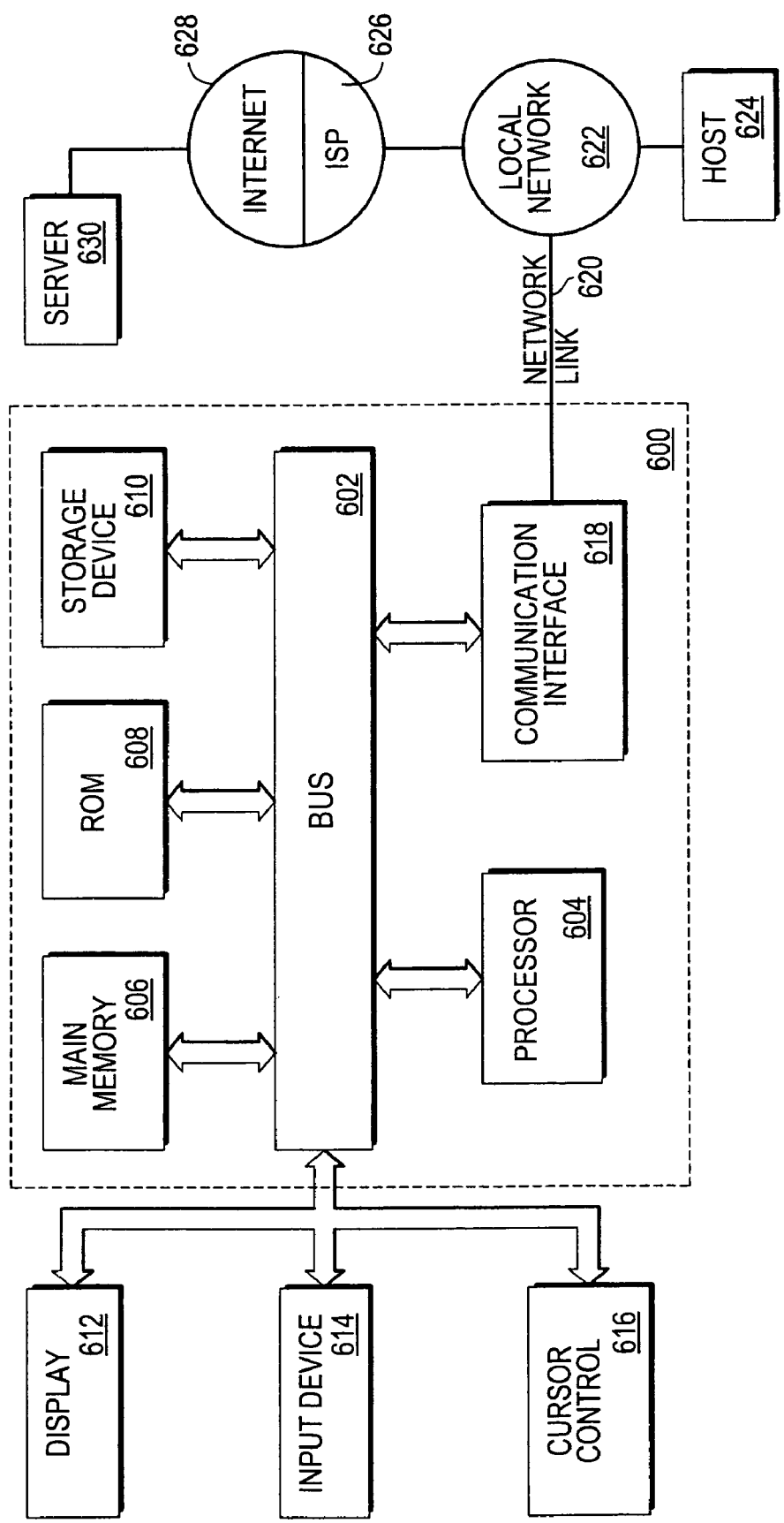

FREQUENT ITEMSET COUNTING USING SUBSETS OF BITMAPS

CROSS-REFERENCE TO RELATED APPLICATIONS

This application is related to the following commonly-assigned co-pending U.S. patent applications:

Ser. No. 10/643,629, entitled FREQUENT ITEMSET COUNTING USING CLUSTERED PREFIXES AND INDEX SUPPORT, filed on Aug. 18, 2003;

Ser. No. 10/643,563, entitled DYNAMIC SELECTION OF FREQUENT ITEMSET COUNTING TECHNIQUE, filed on Aug. 18, 2003;

Ser. No. 10/643,628, entitled EXPRESSING FREQUENT ITEMSET COUNTING OPERATIONS, filed on Aug. 18, 2003;

the contents of each of which are hereby incorporated by reference in their entirety.

FIELD OF THE INVENTION

The present invention relates to database operations and, more specifically, to techniques for performing frequent itemset operations.

BACKGROUND

It is common for a data item that is stored in a database to have a logical relationship with other data items that are stored in the database. A set of data items that are related to each other is referred to herein as an "item group." An example of an item group is the set of all data items related to a particular employee (such as name, age, salary, etc.). Another example of an item group is the set of all data items that were purchased in a particular transaction (such as apples, bananas, and grapes).

A set of similar item groups is referred to herein as an "item group population." Relational database systems are frequently used to store information about large item group populations. For example, a relational database system may be used to store information about all employees of a company. As another example, a relational database system may be used to store information about all sales transactions made at a given store, or at a large chain of stores.

Relational database systems are not only used to store information, but also to gather valuable intelligence based on the information that they store. For example, the management of a chain of stores may perform operations on the sales transaction information stored in a relational database to determine which stores are making the most sales, and which regions of the country are interested in particular products.

The most direct way to perform operations on data that is managed by a relational database server is to issue commands to the database server, where the commands specify the desired operations. In response to the commands, the relational database performs the desired operations and returns the results to the entity that issued the commands.

Of course, for the database server to execute the commands, the commands must conform to the database language that is supported by the database server. One database language that is supported by most relational database servers is SQL. Unfortunately, there is a limit to the type of operations that SQL directly supports. Operations that are not directly supported by SQL may be performed by specifying a series of SQL operations which, when executed in combination with each other, perform the desired unsupported operation.

Depending on the nature of the unsupported operation, the combination of SQL operations required to perform the unsupported operation may be quite complex. Further, amount of time and resources required to execute the series of operations may make the use of SQL impractical. Under these circumstances, it is often more efficient to simply export the data from the database and execute a software program specially designed to perform the desired operation on the expected data. If further operations are to be performed on the results of the operation, then the results of the operation may be imported back into the database.

An example of a type of operation that, in general, cannot be performed efficiently using SQL operations is a frequent itemset operation. A frequent itemset operation is an operation that identifies which sets of items occur together most frequently in a particular item group population. For example, assume that a database stores information about sales transactions for a fruit market that sells apples, bananas and grapes. Assume further that ten percent of the sales transactions involve apples and bananas, that fifty percent of the sales transactions involve apples and grapes, and that ninety percent of the sales transactions involve grapes and bananas. If the frequent itemset operation uses a "frequency threshold" of seventy percent, then the results of the frequent itemset operation would include the itemset (grapes, bananas) but would exclude the itemsets (apples, grapes) and (apples, bananas). On the other hand, if the frequent itemset operation uses a frequency threshold of forty percent, then the results of the frequent itemset operation would include the itemsets (grapes, bananas) and (apples, grapes) but not the itemset (apples, bananas).

Frequent itemset operations may be performed using a plurality of bitmaps. Each of the plurality of bitmaps stores information about the data items contained within an item group. However, the number of item groups, and the number of data items in each item group, may be so large as to prevent all of the bitmaps from being stored simultaneously in volatile memory. Consequently, the performance of a frequent itemset operation typically involves a large number of read operations from a persistent store and write operations to a persistent store. Minimizing the amount of read operations from a persistent store and write operations to a persistent store is advantageous because such operations are slower than operations performed in volatile memory.

Based on the foregoing, it is desirable to provide a technique for performing frequent itemset operations in a manner that reduces the performance problems associated with the current techniques. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2 is an illustration of an item group population stored in the multiple-items-per-row format;

FIG. 5 is an illustration of a set of item groups according to an embodiment; and FIG. 6 is a block diagram that illustrates a computer system upon which an embodiment may be implemented.

DETAILED DESCRIPTION

Figure 1:
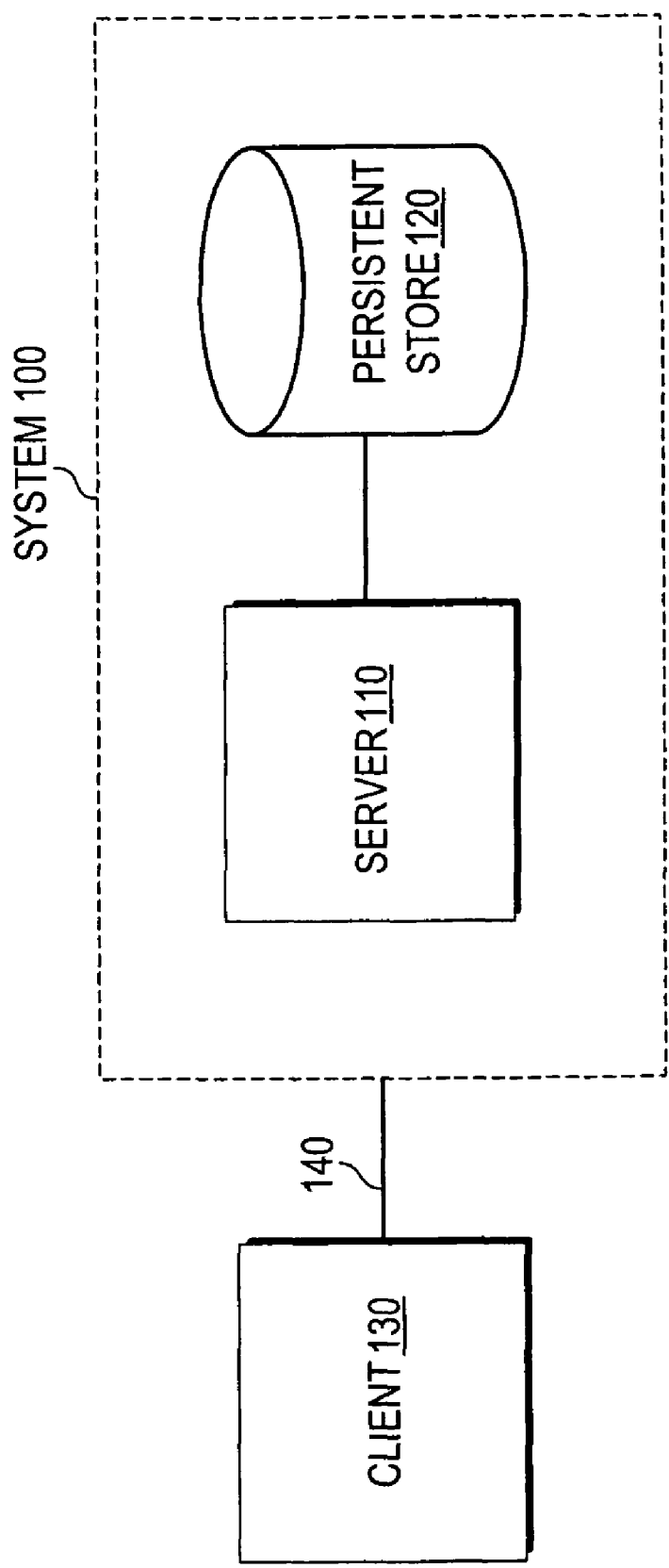
FIG. 1 is a block diagram of a system according to an embodiment.

In the following description, for the purposes of explanation, numerous specific details are set forth in order to provide a thorough understanding of the embodiments described herein. It will be apparent, however, that the embodiments described herein may be practiced without these specific details. In other instances, well-known structures and devices are shown in block diagram form in order to avoid unnecessarily obscuring the description of the embodiments herein.

Functional Overview

Embodiments of the invention enable the performance of an improved frequent itemset operation on an item group population. For example, an item group may correspond to a set of items that were purchased in a transaction, such as bananas, apples, and grapes. Embodiments may perform an improved frequent itemset operation on a set of similar item groups to determine a frequent itemset count for the set of similar item groups. The frequent itemset count describes which items in the set of similar item groups occur together most frequently, e.g., the frequent itemset count may identify that when bananas and ice-cream are purchased together, it is likely that chocolate syrup is also purchased.

In an embodiment, a set of item groups are divided into a plurality of subsets. The number of subsets that the set of item groups are divided into may depend on a set of criteria, e.g., on the number of item groups or the amount of memory that is currently available.

Possible combinations of data items that may frequently appear together in the same item group are referred to as candidate combinations. Candidate combinations having two data items are initially identified ("two-item candidate combinations"), and thereafter the occurrence of each two-item candidate combination in any item group in each subset is counted by comparing item bitmaps in each subset in turn. Next, candidate combinations having three data items ("three-item candidate combinations") are identified based on the count of the two-item candidate combinations. Thereafter, the occurrence of each three-item candidate combinations in any item group in each subset is counted by comparing item bitmaps in each subset in turn. This process is repeated in this fashion until candidate combinations of a greater size cannot be identified.

To elaborate in further detail, initially, in an illustrative example, two-item candidate combinations are identified by determining each unique combination of two data items. For each subset of item groups, item bitmaps associated with each unique combination of two data items are compared with each other to determine a partial frequent itemset count for the item groups in the subset. Generally, the partial frequent itemset count describes which data items in item groups in the subset occur most frequently together. The partial frequent itemset count may describe, for example, how many item groups in the subset contained each two-item candidate combination. The comparison of bitmaps associated with each item group in the subset is performed in volatile memory, although not all of the bitmaps associated with each item group in the subset may be able to be stored in volatile memory simultaneously.

Once the partial frequent itemset count is determined for the first subset, the partial frequent itemset count is stored. After item bitmaps in each subset are compared, the partial frequent itemset count is updated to reflect the item bitmaps that have been compared in the new subset. Once all the subsets have been analyzed, the partial frequent itemset count is referred to as a total frequent itemset count for all item groups. The total frequent itemset count describes the frequency of candidate combinations in items groups across all subsets.

Once the total frequent itemset count is obtained for two-item candidate combinations, a total frequent itemset count may be obtained for candidate combinations having larger number of items. A total frequent itemset count may be obtained for candidate combinations having X items by (a) identifying candidate combinations having X items based on candidate combinations having X−1 items, (b) determining the partial frequent itemset count for candidate combinations having X items in each subset, and (c) determining the total frequent itemset count for candidate combinations having X items by computing the sum of all the partial frequent itemset counts for candidate combinations having X items in each subset.

The total frequent itemset count may be used in a variety of contexts. For example, the total frequent itemset count may be used to perform market basket analysis.

Architecture Overview

FIG. 1 is a block diagram of a system 100 according to an embodiment. The system 100 may be used to performed an improved frequent itemset operation on an item group population. The system 100 includes a server 110 and a persistent store 120. A user or automated process may send and receive communications with the system 100 using a client 130 over communications link 140.

Server 110 may be implemented by any medium or mechanism that provides for performing a frequent itemset operation on an item group population. In an embodiment, server 110 performs the steps illustrated in FIG. 4. Server 110 may be implemented using a computer system 700. Non-limiting, illustrative examples of server 110 include, without limitation, a database server.

Persistent store 120 may be implemented by any medium or mechanism that provides for persistently storing data describing an item group population. Persistent store 120 may be implemented using a computer system 700. Non-limiting, illustrative examples of persistent store 120 include, without limitation, a database, a file system, non-volatile memory, and a portable storage medium.

Client 130 may be implemented by any medium or mechanism that provides for sending and receiving communications to system 100. Client 130 may be used by a user or automated process to initiate a frequent itemset operation using system 100 and to store or retrieve data in persistent store 120. Client 130 may be implemented using a computer system 700. Non-limiting, illustrative examples of client 130 include, without limitation, a personal computer, a wireless device, a cell phone, a supermarket device, a register, and a scanner.

Communications link 140 may be implemented by any medium or mechanism that provides for the exchange of data between client 130 and system 100. Examples of communications link 140 include, without limitation, a network such as a Local Area Network (LAN), Wide Area Network (WAN), Ethernet or the Internet, or one or more terrestrial, satellite or wireless links.

While client 130, server 110, and persistent store 120 are shown in the embodiment of FIG. 1 as separate entities for ease of explanation, other embodiments may implement one or more of client 130, server 110, and persistent store 120 upon a single computer system.

Multiple-Items-Per-Row Format Item Group Populations

Item group populations may be stored in any one of a variety of formats. According to one such format (referred to herein as the "multiple-items-per-row format"), the item group population is stored in a table, where each row of the table is associated with an item group, and
each row of the table stores values that identify the members of the item group associated with the row.

An example of an item group population stored in the multiple-items-per-row format is illustrated in FIG. 2. Referring to FIG. 2, a table 200 stores data for an item group population that includes three item groups. Each of the three rows (202, 204 and 206) of table 200 corresponds to an item group. For the purpose of explanation, the item groups associated with rows 202, 204 and 206 shall be referred to herein as item groups t1, t2 and t3, respectively.

Single-Item-Per-Row Format Item Group Populations

Another format (referred to herein as the "single-item-per-row format") for storing an item group population involves storing the item group population in a two-column table, where for each row one column identifies an item group, and
the other column identifies one of the items in the item group.

Figure 3:
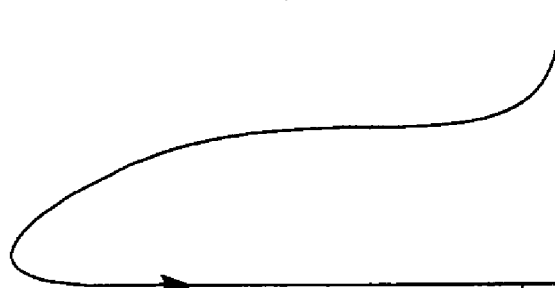
FIG. 3 is an illustration of an item group population stored in the single-item-per-row format.

Since each row only identifies one item of an item group, an item group with N items will be represented by N rows. An example of an item group population stored in the single-item-per-row format is illustrated in FIG. 3. Referring to FIG. 3, table 300 includes data representing the same item group population as is represented in table 200 of FIG. 2. However, in table 300, each row only identifies one (item group, item) association. Thus, item group t2, which contains three items, is represented in three rows.

Other Formats for Storing Item Group Populations

The multiple-items-per-row and single-item-per-row formats for storing item group populations, respectively illustrated in FIGS. 2 and 3, are merely two examples of a virtually unlimited number of ways item group population information may be represented. The techniques described herein are not limited to any particular representation format. However, regardless of the format used, information about the format is known by or communicated to the database server to enable the database server to know how to process the information to perform frequent itemset operations.

Frequent Itemset Counting Using Subsets of Bitmaps

Figure 4:
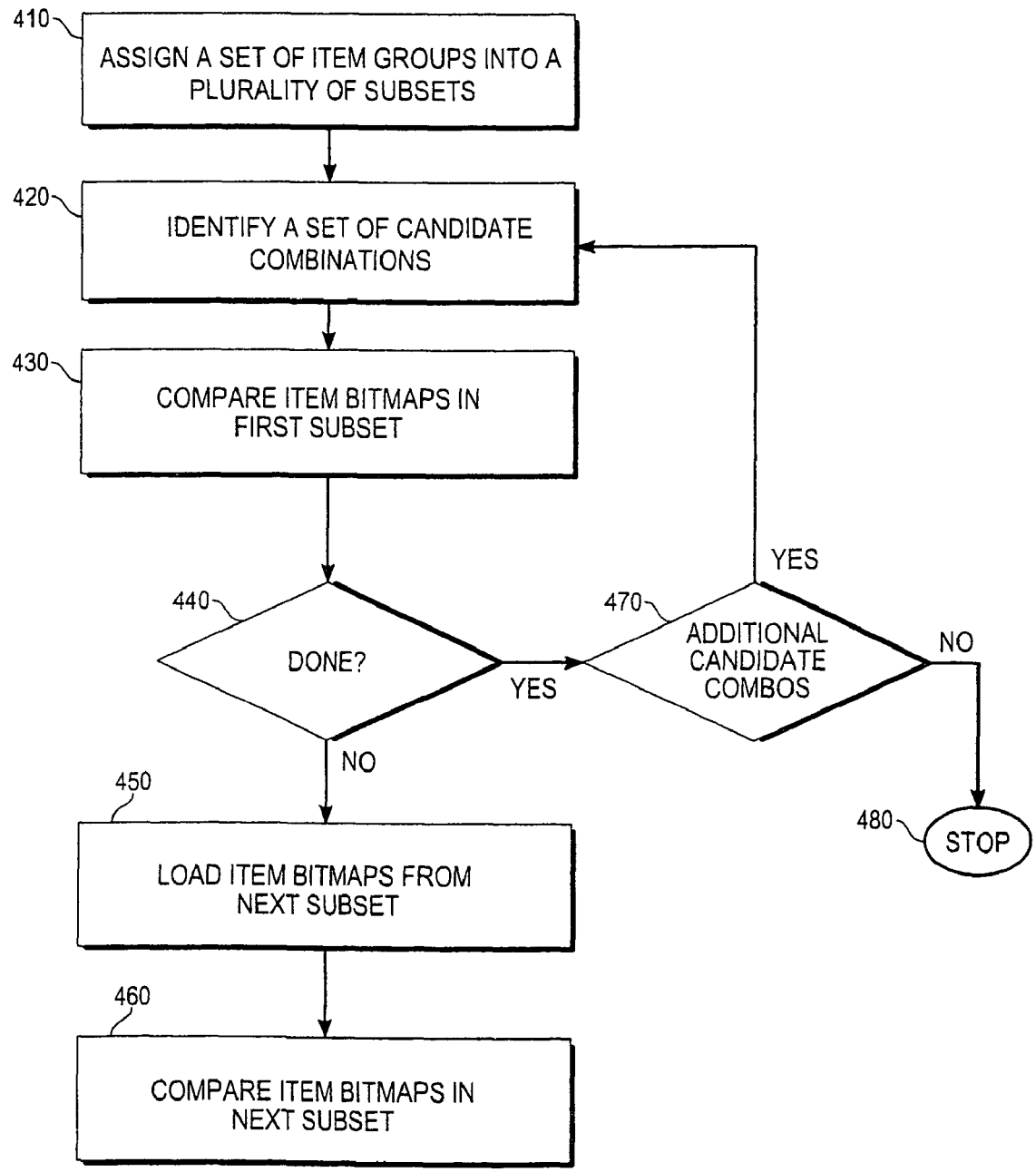
FIG. 4 is a flowchart illustrating the steps performed by an embodiment.

FIG. 4 is a flowchart illustrating the steps performed by an embodiment. Server 110 may perform the steps of FIG. 4 to perform an improved frequent itemset operation on an item group population.

Initially, in step 410, a set of item groups are divided into a set of item group subsets (hereinafter called subsets for brevity). Server 110 may perform step 210 in response from receiving a command from client 130.

To illustrate the performance of step 210, an example shall be described with reference to FIG. 5, which is an illustration of a set of item groups according to an embodiment. FIG. 5 shows a list of eight data items and three item groups. Each data item corresponds to something that could be purchased in a grocery store, e.g., fruit. In the example shown in FIG. 5, each item group corresponds to a particular transaction of items purchased in a grocery store.

Each item group is associated with an item group bitmap. An item group bitmap is a bitmap that describes which data items are present in the item group associated with the item group bitmap. For example, item group 1 is associated with the item group bitmap "10110110." Each data item is associated with one or more item bitmaps. An item bitmap is a bitmap that describes which item groups in a particular subset contain the data item associated with the item bitmap. For example, the item bitmap for the "apple" data item for subset 1 is "10." As an item bitmap contains data that describes item groups in a single subset, a particular data item may be associated with more than one item bitmap, e.g., if there are 40 subsets, then a data item is associated with 40 item bitmaps.

Each bit in the item group bitmap is associated with a particular data item. For example, the first bit in each item group bitmap is associated with the "apple" data item, and the third bit in each item group bitmap is associated with the "watermelon" data item. Each bit in the item bitmap is associated with a particular item group. For example, the first bit in each item bitmap in subset 1 is associated with item group 1, and the second bit in each item bitmap in subset 1 is associated with item group 2.

The value of each bit of an item bitmap identifies whether the particular item group associates with the bit contains the data item associated with the item bitmap. For example, if an item group associated with a particular bit of the item bitmap contains the data item associated with the item bitmap, then the bit associated with the particular data item has a value of "1" (i.e., TRUE), and if an item group associated with a particular bit of the item bitmap contains the data item associated with the item bitmap, then the bit associated with the particular data item has a value of "0" (i.e., FALSE). Thus, in the example of FIG. 5, the item group associated with the data item "grapefruit" in subset 1 indicates that item group 1 does not contain grapefruit (because the value of the first bit is "0"), and item group 2 does contain grapefruit (because the value of the second bit is "1").

Likewise, the value of each bit of an item group bitmap identifies whether the particular data item associated with the bit is contained within the item group associated with the item group bitmap. Thus, in the example of FIG. 5, item group 1 and item group 2 both contain pineapples because item group 1 and item group 2 both have a value of "1" in the bit corresponding to the pineapple data item.

The data illustrated in FIG. 5 may be stored in persistent store 120. Storing data about an item group population is useful because it enables system 100 to perform a frequent itemset operation that identifies which sets of data items occur together most frequently in a particular item group population. For example, a frequent itemset operation may identify that if a user purchases pineapples, then it is likely that the user will purchase strawberries.

While only eight data item are shown in FIG. 5 for ease of explanation, in a real-world implementation, there could be any number of data items. Indeed, the number of data items may be extremely large, e.g., 5,000. While only three item groups are shown in FIG. 5 for ease of explanation, in a real-world implementation, there could be any number of transactions, e.g., 8 million. Consequently, the number of item groups may be too many for the server 110 to store all the item group bitmaps in volatile memory at the same time.

Returning to the performance of step 410, server 110 divides the set of item groups into a set of subsets. The set of item groups may be divided into any number of subsets. For example, for ease of explanation, the item groups illustrated in FIG. 5 have been divided into subset 1 and subset 2. Additional item groups belonging to the same item group population as the item groups depicted in FIG. 5 may be divided into additional subsets not depicted in FIG. 5.

The number of subsets that the set of item groups are divided into may depend on a set of criteria. The server 110 uses a set of criteria to determine what is the optimal number of subsets to divide the item groups into to maximize the number of bitmaps that may be stored simultaneously in volatile memory. In one embodiment, server 110 determines the number of subsets in which to divide the item groups into based on the size of the item bitmaps. For example, the number of subsets used in step 410 may be the square root of the number of item groups (as each item group corresponds to a bit of the item bitmaps), e.g., if there are 100 total item groups, then, in step 410, server 110 divides the 100 item groups into 10 subsets, wherein each subset comprises 10 item groups.

In other example, the number of subsets used in step 410 may be determined based on the following analysis, wherein P is the number of subsets, C is the cluster size (equal to block size * number of blocks per cluster), M is the memory size, and S is the item bitmap size:

$P*C <= M$
$P = S/M$
$(S/M)*C <= M$
$S*C <= M*M$
$M >= \text{square root}(S*C)$
$P <= \text{square root}(S/C)$ Thus, the number of subsets (P) used in step 410 may be equal to the square root of (item bitmap size/cluster size).

In another embodiment, server 110 determines the number of subsets in which to divide the item groups into based on the amount of volatile memory that is currently available. For example, server 110 may dynamically determine how much volatile memory is currently available to a user requesting the performance of step 410, and thereafter, determine what is the optimal number of subsets to divide the item groups into based on the amount of volatile memory currently available to the user.

When all item groups in the set of item groups are assigned to a particular subset, each bitmap associated with each item is also logically divided. As each bitmap associated with an item contains a bit associated with each item group, each bitmap associated with an item spans each subset. For example, as shown in FIG. 5, the bitmap associated with the apple data item overlaps all subsets (although only subset 1 and subset 2 are shown in FIG. 5.

In an embodiment, an index is used on each item bitmap to identify portions of the bitmap associated with an item in a particular subset, i.e., the index is used to identify particular item bitmaps. Each index entry identifies a particular item bitmap in a particular subset. For example, an embodiment may partition bitmaps A, B, C, D, and E into N subsets. Index entries for each bitmap may appear as shown below:

(A, subset [1], disk offset)
(A, subset [2], disk offset)
...
(E, subset [N], disk offset)

Thus, given a particular bitmap and a subset number, one may retrieve the disk offset using the index. Using the disk offset, one may retrieve the corresponding item bitmap. The above use of the index is merely illustrative, as other embodiments may employ other mechanisms to identify portions of item bitmaps. After the performance of step 410, processing proceeds to step 420.

In step 420, a set of candidate combinations are identified. Candidate combinations are possible combinations of data items that may frequently appear together in the same item group in the set of item groups. Candidate combinations are processed in the steps of FIG. 4 to determine whether members of the candidate combinations exceed the frequency threshold. Candidate combinations of the same size are typically analyzed together.

The first time step 420 is performed, the set of candidate combinations are equal to the set of all unique two-item combinations. Each additional time that step 420 is performed, the set of candidate combinations identified in step 420 are based on the previous set of candidate combinations. Unless it is the first time step 420 is performed, the set of candidate combinations identified in step 420 must meet the following set of criteria: (1) the set of identified candidate combinations must each have one more data item than the previous set of candidate combinations, and (2) each subset of data items in each member of the set of identified candidate combinations must meet or exceed the frequency threshold.

To illustrate, a set of candidate combinations identified in step 420 will be discussed for an illustrative set of prior candidate combinations. Assume that the following two-item candidate combinations have been identified as exceeding the frequency threshold:

(banana, apple), (banana, plum), (apple, plum), (apple, milk), (apple, bread), and (bread, milk).

The three-item candidate combinations of (banana, apple, plum) and (apple, bread, milk) may be identified in step 420 as each subset of items in each three-item candidate combination meets or exceeds the frequency threshold, and each identified candidate combination is comprised of one more item than the prior two-item candidate combinations. After the performance of step 420, processing proceeds to step 430.

In step 430, item bitmaps that: (a) are in the first subset, and (b) are associated with an item of a candidate combination are compared with each other. For each candidate combination, each item bitmap in the first subset that is associated with an item in a particular candidate combination is compared against all other item bitmaps in the first subset that are associated with other items in the particular candidate combination to determine the frequency of each candidate combination in the first subset.

For example, assume the following candidates combinations are identified in step 420: (banana, apple, plum) and (apple, bread, milk). In step 430, the item bitmap in the first subset associated with banana, the item bitmap in the first subset associated with apple, and the item bitmap in the first subset associated with plum will each be compared together. Also, the item bitmap in the first subset associated with apple, the item bitmap in the first subset associated with bread, and the item bitmap in the first subset associated with milk will each be compared together. As a result of performing step 430, server 110 obtains a partial frequent itemset count that describes, for each candidate combination, how many item groups in the first subset contained the candidate combination.

There are numerous ways to determine the partial frequency itemset count. In one approach, bitmaps may be compared with one another using a Boolean AND operator. When bitmaps are compared using the Boolean AND operator, a resulting bitmap is produced wherein each bit of the resulting bitmap has a value of "1" (i.e., "TRUE") only if all of the corresponding bits in the bitmaps being compared also have a value of "1" (i.e., "TRUE"). For example, if the item bitmap for the "apple" data item in subset 1 ("10") is compared with the item bitmap for the "peach" data item in subset 1 ("00"), then the bitmap resulting from the comparison ("the resulting bitmap") is "00," since item group 1 and item group 2 both do not have both apples and peaches.

Each item bitmap, in the first subset, associated with an item in the candidate combination is compared against each other item bitmap, in the first subset, associated with an item in the candidate combination to determine how many item groups in the first subset contain the candidate combination. A count value may be determined for a candidate combination by inspecting the number of "1's" in the resulting bitmap. Once the count value for the candidate combination is obtained, the resulting bitmap may be discarded. For each candidate combination, a count value is stored that describes how many item groups each contain the candidate combination. All of count values for all the candidate combinations being analyzed in step 430 are collectively referred to as the partial frequent itemset count.

In an embodiment, the partial frequent itemset count for the subset is stored in volatile memory, and if volatile memory is not available, then the partial frequent itemset count is stored in non-volatile memory.

Various other approaches may be used by embodiments to compare bitmaps in step 430. Embodiments of the invention are not limited to a particular approach to comparing bitmaps to determine the frequency of each combination of data items in items groups. Additional approaches to determining the frequency of each combination of data items in items groups are described in Ser. No. 10/643,629, entitled FREQUENT ITEMSET COUNTING USING CLUSTERED PREFIXES AND INDEX SUPPORT, filed on Aug. 18, 2003.

In an embodiment, sever 110 may be unable to store all the item bitmaps associated with the candidate combinations into volatile memory in performing step 430. Such an embodiment shall be described in further detail below in the section entitled "Comparing Bitmaps That Are Stored In Non-Volatile Memory." After the performance of step 430, processing proceeds to step 440.

In step 440, a determination is made as to whether item bitmaps in all subsets have been compared for the current set of candidate combinations. Server 110 performs step 440. If the determination of step 440 is negative (there are additional item bitmaps in other subsets that need to be compared for the current set of candidate combinations), then processing proceeds to step 450. If the determination of step 440 is positive (there are no more additional item bitmaps in other subsets that need to be compared for the current set of candidate combinations), then processing proceeds to step 470.

If there are additional item bitmaps in other subsets that need to be compared for the current set of candidate combinations, in step 450, the item bitmaps currently stored in volatile memory are removed from volatile memory. Thereafter, item bitmaps in the next subset are stored in volatile memory. In an embodiment, the item bitmaps that are removed from memory may be stored in non-volatile memory, e.g., the item bitmaps may be stored in persistent store 120. In an alternate embodiment, item bitmaps that are removed from memory may be discarded, i.e., as the item bitmaps are already located on a persistent storage, the item bitmaps may simply be deleted from volatile memory. Item bitmaps may be loaded into volatile memory using an entry to an index on the bitmap associated with the item, as explain above.

In an embodiment, server 110 may be unable to store all the item bitmaps in the current subset into volatile memory in the performance of step 450. Such an embodiment shall be described in further detail below in the section entitled "Comparing Bitmaps That Are Stored In Non-Volatile Memory." After the performance of step 450, processing proceeds to step 460.

In step 460, the item bitmaps currently stored in volatile memory are compared. The comparison of the bitmaps of step 460 may be performed in the same manner as the comparison of bitmaps in step 430.

After the bitmaps are compared in step 460, the stored partial frequent itemset count is updated to reflect the new item bitmap comparisons performed in step 460. Thus, the partial frequent itemset count includes data about the item bitmaps in the current subset being compared in step 460, and item bitmaps in any prior subset that have already been compared.

After the performance of step 460, processing returns to step 440. In this way, server 110 compares item bitmaps in each subset, in turn, until item bitmaps, in all of the subsets, which are associated with items in any particular current candidate combination have been compared against item bitmaps associated with any other item in the particular current candidate combination.

Once item bitmaps, in all of the subsets, that are associated with items in any particular current candidate combination have been compared against item bitmaps associated with any other item in the particular current candidate combination, then processing proceeds to step 470. In step 470, the partial frequent itemset count describes which sets of items in the item groups across all subsets occur most frequently together because the partial frequent itemset count is updated after each subset is compared to reflect all the subsets that have been compared.

After the last subset is compared, the partial frequent itemset count is referred to as the total frequent itemset count. The total frequent itemset count describes how many item groups contained the current candidate combinations. For example, if there are 10 item groups in each subset, and there are 10 subsets, then the total frequent itemset count describes the frequency of the candidate combinations in the 100 item groups in the item group population.

A determination is made in step 470 as to whether there are additional candidate combinations that may be analyzed. If the determination of step 470 is negative (there are no additional candidate combinations to analyze), then processing proceeds to step 480. There may be no more additional candidate combinations to analyze for a variety of reasons, such as, no additional combinations of data items having a larger size satisfy the criteria for becoming candidate combinations. However, if the determination of step 470 is positive (there are additional candidate combinations to analyze), then processing proceeds to step 420, to allow the next set of candidate combinations to be analyzed.

In step 480, all the possible candidate combinations have been analyzed. Advantageously, the total frequent itemset count for the candidate combinations analyzed describes the frequency of those candidate combinations in items groups across all subsets. Knowing the frequency of each combination of data items across all of the item groups facilitates market basket analysis by enabling one to predict that a first set of data items will appear in an item group given that a second set of data items appear in the item group. This information may be useful in cross selling and promotions. For example, if item groups correspond to purchases made in a transaction, then the total frequent itemset count may be used to determine, based on a set of purchased items, what other items are likely to be purchased by the purchaser ("items of interest"). The item of interest may be the subject of a coupon that is dynamically printed or otherwise made available to the purchaser at the time of purchase. Also, if it is known that those people who purchase a suit are likely to purchase a belt, then this knowledge is helpful to those selling suits, as they may attempt to sell a belt to those who purchase a suit.

Comparing Bitmaps that are Stored in Non-Volatile Memory

Generally, after performing the step 410, the size of a particular subset will be such that the volatile memory of server 110 can simultaneously store all bitmaps associated with a particular subset. However, in some implementations, the volatile memory of server 110 may not be sufficient to store all bitmaps associated with a particular subset. In this case, as not all the bitmaps associated with a particular subset may be simultaneously stored in memory, item bitmaps of candidate combinations for a particular subset may be compared with each other by performing a "multiple-pass" approach, described below.

According to the "multiple-pass" approach, as many item bitmaps of a particular subset as possible are stored in volatile memory, while leaving at least room for an additional item bitmap. For example, assume that (a) a volatile memory may only store 4 item bitmaps, and (b) there are 5 item bitmaps that need to be compared, namely bitmaps A, B, C, D, and E. Thus, 3 item bitmaps may be loaded into volatile memory, as room for at least one item bitmap should be made available in volatile memory. The 3 item bitmaps may be loaded using an entry to an index, as explained above. For example, assume that item bitmaps for A, B, and C are loaded and stored into volatile memory.

If item bitmaps of candidate combination (A, B, C) need to be compared against each other, then all the item bitmaps of this particular candidate combination are currently stored in volatile memory, and the item bitmaps may be compared against each other. However, if item bitmaps of candidate combination (A, B, D) need to be compared against each other, then an index is used to determine the current disk offset corresponding to item bitmap D, and item bitmap D is loaded into volatile memory to the available room in volatile memory. Thereafter, all the item bitmaps of candidate combination (A, B, D) are loaded into volatile memory, and may be compared against one another. If, after storing item bitmap D into volatile memory, the next candidate combination that needs to be processed is (A, B, E), then (a) item bitmaps A and B remain in volatile memory, and (b) the item bitmap E is loaded into volatile memory into the position formerly held by item bitmap D. Thus, all the item bitmaps of candidate combination (A, B, E) are loaded into volatile memory, and may be compared against one another.

Occasionally, if the available volatile memory of server 110 is low, it may not be possible to store all the item bitmaps of a particular candidate combination in volatile memory simultaneously. In such a situation, two or more item bitmaps may be compared to produce a "cluster bitmap." A cluster bitmap is a bitmap that describes those bits that two or more bitmaps have in common. For example, if two or more item bitmaps are compared to produce a cluster bitmap, then the cluster bitmap may describe all item groups that contain items associated with each of the two or more item bitmaps. For example, the apple item bitmap, peach item bitmap, and watermelon item bitmap of FIG. 5 may be compared to produce a cluster bitmap that describes all item groups in a particular subset that contain apples, peaches, and watermelons.

Advantageously, this allows multiple data items to be compared using a single cluster bitmap, thereby increasing the amount of available space in volatile memory for storing additional item bitmaps. For example, to compare each of the item bitmaps of candidate combination (apple, peach, watermelon, cherry) using the above illustrative cluster bitmap generated for apples, peaches, and watermelons, only the additional item bitmap for cherry is required. To determine how many item groups contained the data items apple, peach, watermelon, cherry, all that is necessary is to compare the item bitmap for cherry with the cluster bitmap for apples, peaches, and watermelons.

Additional description about the operation of cluster bitmaps is available at U.S. patent application Ser. No. 10/643,629, entitled FREQUENT ITEMSET COUNTING USING CLUSTERED PREFIXES AND INDEX SUPPORT, filed on Aug. 18, 2003.

Implementing Mechanisms

Client 130, server 110, and persistent store 120 may each be implemented on a computer system. FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method, comprising:
   assigning each item group, within a set of item groups, to one of a plurality of item group subsets based at least in part on an amount of volatile memory available in a computer system, wherein each item group subset includes one or more entire item groups,
   wherein each item group is associated with an item group bitmap that indicates which items, of a set of items, belong in said item group;
   determining a set of candidate combinations of two or more items from the set of items;
   for each candidate combination of two or more items in said set of candidate combinations, performing the step of:
      in each item group subset, comparing an item bitmap associated with an item in the candidate combination with each other item bitmap associated with one or more other items in the candidate combination, to determine a partial frequent itemset count for the candidate combination in the item group subset, wherein the partial frequent itemset count comprises the total number of item groups in the item group subset that contain the candidate combination;
   combining the partial frequent itemset counts of the item group subsets to derive a total frequent itemset count for the set of candidate combinations; and
   storing said total frequent itemset count in a volatile or non-volatile computer-readable storage medium;
   wherein the method is performed by one or more computing devices.

2. The method of claim 1, wherein the step of assigning each item group comprises:
  determining how many item group subsets are in the plurality of item group subsets based at least in part on a size associated with each item bitmap.

3. The method of claim 1, wherein the step of assigning each item group comprises:
  determining how many item group subsets are in the plurality of item group subsets based at least in part on the square root of a number of item groups within the set of item groups.

4. The method of claim 1, wherein the step of comparing an item bitmap further comprises:
  determining that all the item bitmaps of a particular candidate combination cannot be stored simultaneously in volatile memory;
  generating a cluster bitmap associated with a set of item bitmaps, wherein each of the set of item bitmaps is associated with one item in the particular candidate combination; and
  comparing the cluster bitmap with at least one additional item bitmap associated with an item contained within the particular candidate combination.

5. The method of claim 1, wherein each item group is associated with item group bitmaps of equal size, and wherein each item group subset contains an equal number of item groups.

6. The method of claim 1, wherein the set of candidate combinations is a first set of candidate combinations, wherein the total frequent itemset count comprises a first total frequent itemset count that is associated with the first set of candidate combinations each having a first size, and further comprising:
  generating a second total frequent itemset count that is associated with a second set of candidate combinations each having a second size.

7. A non-transitory machine-readable storage medium carrying one or more sequences of instructions, wherein execution of the one or more sequences of instructions by one or more processors causes the one or more processors to perform the steps of:
  assigning each item group, within a set of item groups, to one of a plurality of item group subsets based at least in part on an amount of volatile memory available in a computer system, wherein each item group subset includes one or more entire item groups;
  wherein each item group is associated with an item group bitmap that indicates which items, of a set of items, belong in said item group;
  determining a set of candidate combinations of two or more items from the set of items;
  for each candidate combination of two or more items in the set of candidate combinations, performing the step of:
    in each item group subset, comparing an item bitmap associated with an item in the candidate combination with each other item bitmap associated with one or more other items in the candidate combination, to determine a partial frequent itemset count for the candidate combination in the item group subset, wherein the partial frequent itemset count comprises the total number of item groups in the item group subset that contain the candidate combination;
  combining the partial frequent itemset counts of the item group subsets to derive a total frequent itemset count for the set of candidate combinations; and
  storing said total frequent itemset count in a volatile or non-volatile computer-readable storage medium.

8. The machine-readable storage medium of claim 7, wherein the step of assigning each item group comprises:
  determining how many item group subsets are in the plurality of item group subsets based at least in part on a size associated with each item bitmap.

9. The machine-readable storage medium of claim 7, wherein the step of assigning each item group comprises:
  determining how many item group subsets are in the plurality of item group subsets based at least in part on the square root of a number of item groups within the set of item groups.

10. The machine-readable storage medium of claim 7, wherein the step of comparing an item bitmap further comprises the steps of:
  determining that all the item bitmaps of a particular candidate combination cannot be stored simultaneously in volatile memory;
  generating a cluster bitmap associated with a set of item bitmaps, wherein each of the set of item bitmaps is associated with one item in the particular candidate combination; and
  comparing the cluster bitmap with at least one additional item bitmap associated with an item contained within the particular candidate combination.

11. The machine-readable storage medium of claim 7, wherein each item group is associated with item group bitmaps of equal size, and wherein each item group subset contains an equal number of item groups.

12. The machine-readable storage medium of claim 7, wherein the set of candidate combinations is a first set of candidate combinations, wherein the total frequent itemset count comprises a first total frequent itemset count that is associated with the first set of candidate combinations each having a first size, and wherein execution of the one or more sequences of instructions by the one or more processors causes the one or more processors to perform the step of:
  generating a second total frequent itemset count that is associated with a second set of candidate combinations each having a second size.

* * * * *

UNITED STATES PATENT AND TRADEMARK OFFICE
CERTIFICATE OF CORRECTION

PATENT NO. : 7,756,853 B2  Page 1 of 1
APPLICATION NO. : 10/927893
DATED : July 13, 2010
INVENTOR(S) : Wei Li et al.

It is certified that error appears in the above-identified patent and that said Letters Patent is hereby corrected as shown below:

On page 2, in column 2, under "Other Publications", line 2, delete "Santiagon, Chile," and insert -- Santiago, Chile, --, therefor.

Signed and Sealed this
Nineteenth Day of April, 2011

David J. Kappos
*Director of the United States Patent and Trademark Office*